(12) United States Patent
Wisniewski (10) Patent No.: US 12,054,262 B2
(45) Date of Patent: Aug. 6, 2024

(54) SEAT ASSEMBLY AND PASSENGER SEAT ARRANGEMENT

(71) Applicant: Adient Aerospace, LLC, Bothell, WA (US)

(72) Inventor: Max Wisniewski, Kirkland, WA (US)

(73) Assignee: Adient Aerospace, LLC, Bothell, WA (US)

( * ) Notice: Subject to any disclaimer, the term of this patent is extended or adjusted under 35 U.S.C. 154(b) by 233 days.

(21) Appl. No.: 17/332,849

(22) Filed: May 27, 2021

(65) Prior Publication Data

US 2021/0371112 A1 Dec. 2, 2021

Related U.S. Application Data

(60) Provisional application No. 63/030,550, filed on May 27, 2020.

(51) Int. Cl.
*B64D 11/06* (2006.01)

(52) U.S. Cl.
CPC ...... *B64D 11/0639* (2014.12); *B64D 11/0627* (2014.12); *B64D 11/0636* (2014.12); *B64D 11/0693* (2013.01)

(58) Field of Classification Search
None
See application file for complete search history.

(56) References Cited

U.S. PATENT DOCUMENTS

| | | | | |
|---|---|---|---|---|
| 3,580,630 A * | 5/1971 | Fetter | ............... | B60N 2/3011 297/125 |
| 3,893,729 A * | 7/1975 | Sherman | ............... | B60N 2/062 244/118.6 |
| 4,533,175 A * | 8/1985 | Brennan | ............ | B64D 11/0693 297/146 |
| 5,234,224 A * | 8/1993 | Kim | ............... | B62B 7/12 280/30 |
| 6,327,726 B1 * | 12/2001 | Weber | ............... | A47D 5/006 5/118 |
| 6,488,327 B1 | 12/2002 | Pearse et al. | | |
| 10,076,986 B2 * | 9/2018 | Clark | ............... | B60N 3/103 |
| 11,723,477 B2 * | 8/2023 | Rogers | ............... | A47D 1/103 297/118 |

(Continued)

FOREIGN PATENT DOCUMENTS

| | | | | |
|---|---|---|---|---|
| CN | 115402516 A | * | 11/2022 | ......... B64D 11/0636 |
| DE | 102011008624 B4 | | 12/2013 | |

(Continued)

OTHER PUBLICATIONS

Extended European Search Report, Application No. 22174878.3, Dated Oct. 17, 2022.

*Primary Examiner* — David E Allred
(74) *Attorney, Agent, or Firm* — Jordan IP Law, LLC (57) ABSTRACT

A seat assembly includes a base structure having at least one of a seat pan shell and a backrest shell, and one or more attachment structures configured to removably couple at least one of the seat pan shell and the backrest shell to a seat surface arrangement or a utility surface arrangement. The base structure is convertible between a passenger seat and a utility element based on the coupling of the seat surface arrangement or the utility surface arrangement, respectively, to the base structure.

20 Claims, 8 Drawing Sheets

(56) References Cited

U.S. PATENT DOCUMENTS

| | | | | |
|---|---|---|---|---|
| 2004/0046430 | A1* | 3/2004 | Plant | B60N 2/79 |
| | | | | 297/248 |
| 2005/0184566 | A1* | 8/2005 | Baumann | B64D 11/0638 |
| | | | | 297/248 |
| 2006/0226670 | A1* | 10/2006 | Bernstein | B60R 11/02 |
| | | | | 296/64 |
| 2009/0051188 | A1* | 2/2009 | Foussianes | B60N 2/2893 |
| | | | | 296/68.1 |
| 2010/0243691 | A1 | 9/2010 | Salisbury et al. | |
| 2012/0235451 | A1* | 9/2012 | Hrdlicka | B60R 7/043 |
| | | | | 297/188.2 |
| 2013/0328362 | A1* | 12/2013 | Miller | A47C 7/62 |
| | | | | 297/188.2 |
| 2015/0130231 | A1* | 5/2015 | Lindsay | B60N 2/34 |
| | | | | 297/125 |
| 2015/0336485 | A1* | 11/2015 | Lee | B60N 2/3045 |
| | | | | 297/340 |
| 2016/0347454 | A1 | 12/2016 | Abreu et al. | |
| 2017/0369172 | A1 | 12/2017 | Matthews et al. | |
| 2019/0071181 | A1 | 3/2019 | Demary et al. | |
| 2020/0317137 | A1* | 10/2020 | Ahlning | B60N 2/32 |
| 2021/0330088 | A1* | 10/2021 | Castellon, Sr. | A47C 7/62 |
| 2022/0144330 | A1* | 5/2022 | Bowman | B60N 2/2818 |
| 2022/0227492 | A1* | 7/2022 | Puertolas | B64D 11/00151 |

FOREIGN PATENT DOCUMENTS

| | | | | |
|---|---|---|---|---|
| DE | 102018213506 | A1 | 2/2020 | |
| EP | 2209402 | B1 | 3/2013 | |
| EP | 4095040 | A1 * | 11/2022 | B64D 11/0636 |
| ES | 1131855 | U | 11/2014 | |

* cited by examiner

SEAT ASSEMBLY AND PASSENGER SEAT ARRANGEMENT

CROSS-REFERENCE TO RELATED APPLICATION

This application claims the benefit of and priority to U.S. Provisional Application No. 63/030,550, entitled "Seat Assembly and Passenger Seat Arrangement", filed May 27, 2020, which is incorporated by reference herein in its entirety.

BACKGROUND

Seat units, such as for an aircraft, can be configured as a seat assembly (e.g., an aircraft seat assembly) and have a passenger seat arrangement for a vehicle cabin (e.g., an aircraft cabin). Known seat assemblies often include a base structure, such as a frame structure, to support cushions. The cushions may be detachably attached to the base structure.

However, known seat assemblies are not easily reconfigurable and typically have to be replaced for different purposes. For example, when changing from a passenger seat configuration to a utility element configuration, known seat assemblies have to be fully disassembled to exchange the passenger seat with, for example, a utility element. Thus, with known seat assemblies, reconfiguring or changing the seats for different purposes can be time consuming and costly.

SUMMARY

In one aspect, a seat assembly includes a base structure having at least one of a seat pan shell and a backrest shell, and one or more attachment structures configured to removably couple at least one of the seat pan shell and the backrest shell to a seat surface arrangement or a utility surface arrangement. The base structure is convertible between a passenger seat and a utility element based on the coupling of the seat surface arrangement or the utility surface arrangement, respectively, to the base structure.

In another aspect, a passenger seat arrangement for a vehicle cabin includes a first passenger seat and a seat assembly, wherein the first passenger seat is arranged laterally adjacent to the seat assembly. The seat assembly includes a base structure having at least one of a seat pan shell and a backrest shell, and one or more attachment structures configured to removably couple at least one of the seat pan shell and the backrest shell to a seat surface arrangement or a utility surface arrangement. The base structure is convertible between a passenger seat and a utility element based on the coupling of the seat surface arrangement or the utility surface arrangement, respectively, to the base structure.

In another aspect, an aircraft seat arrangement includes a first passenger seat, a second passenger seat, and a third passenger seat, wherein the second passenger seat is between the first and second passenger seats and together define a seating row. At least one of the first passenger seat, the passenger second seat, and the third passenger seat include a seat assembly. The seat assembly includes a base structure having at least one of a seat pan shell and a backrest shell, and one or more attachment structures configured to removably couple at least one of the seat pan shell and the backrest shell to a seat surface arrangement or a utility surface arrangement. The base structure is convertible between a passenger seat arrangement and a utility element based on the coupling of the seat surface arrangement or the utility surface arrangement, respectively, to the base structure.

BRIEF DESCRIPTION OF THE DRAWINGS

The various implementations, embodiments, and examples will become more fully understood from the detailed description given herein below and the accompanying drawings which are given by way of illustration only, and thus, are not limitative of the implementations, embodiments, and examples described herein, wherein.

Corresponding parts are marked with the same reference symbols in all figures.

DETAILED DESCRIPTION

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment", "one implementation", or "one example" are not intended to be interpreted as excluding the existence of additional embodiments, implementations, or examples that also incorporate the recited features. Moreover, unless explicitly stated to the contrary, embodiments, implementations, or examples "comprising" or "having" an element or a plurality of elements having a particular property can include additional elements not having that property.

While various spatial and directional terms, such as "top," "bottom," "upper," "lower," "vertical," and the like are used to describe embodiments, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations provide an improved seat assembly that is convertible, such as between a passenger seat and a utility element. For example, one seat assembly can be used for different purposes and avoids a full disassembly of a passenger seat to exchange the passenger seat with a utility element. As such, an improved passenger seat arrangement for a vehicle cabin results in various examples, such as for use in an aircraft cabin with the seat assembly. It should be noted that although various examples are described in an aircraft environment, one or more examples described herein are implementable in non-aircraft environments, such as with seats in other vehicles.

One or more implementations include a seat assembly with a passenger seat arrangement that is configured for easy conversion. For example, a seat assembly, in particular an aircraft seat assembly, includes at least a base structure having at least one of a seat pan shell and a backrest shell, a seat surface arrangement and a utility surface arrangement. In various implementations, the base structure includes an attachment structure to receive corresponding attachment structures of the seat cushion arrangement or the utility surface arrangement, wherein the base structure is convertible into a passenger seat and a utility element depending on the surface arrangement detachably attached to the base structure as described in more detail herein.

For example, the seat assembly is arranged in an economy class of an airline or aircraft. However, as should be appreciated, the seat assembly can be arranged in any passenger carrying vehicle, such as a bus, a train or the like. One or more examples include seat assemblies for use in commercial passenger vehicles that come in many different configurations. But, with the herein described implementations, seat assemblies do not have to be disassembled when not in use and can be converted to a non-seat structure, such as a utility structure for passengers. That is, various examples provide an option and features to convert unused seating to a non-seat structure that contains useful passenger utility features.

One or more implementations provide a simple and lightweight seat assembly with an easy-to-exchange feature to change a passenger seat into a passenger utility element. When the seat assembly is not used as a passenger seat, for example, due to less passengers taking the flight and/or due to safety, such as particular health reasons (e.g., restraining orders, social separation regulations), the seat assembly is convertible into a utility element for another passenger seated next to the seat assembly. As a result, the passenger experience is improved (e.g., a feeling of comfort and luxury is provided in the economy class, whereby private utility surfaces are made available to passengers of the economy class).

Figure 1A:
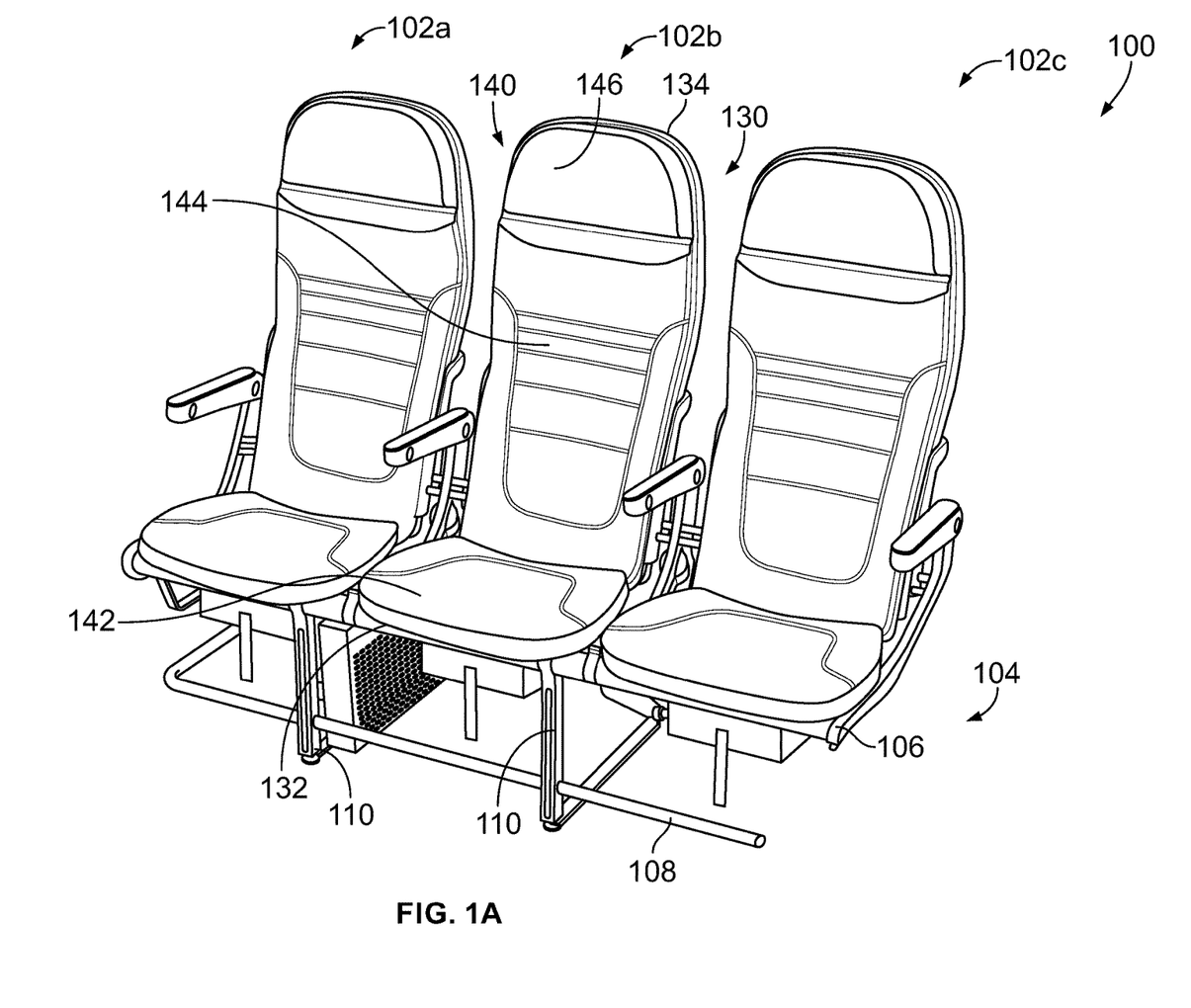
FIG. 1A shows a perspective view of a passenger seat arrangement having adjacent passenger seats in accordance with an example.

With particular reference to the Figures, FIG. 1A shows in a perspective view a passenger seat arrangement 100 having a number of adjacent passenger seats 102a, 102b, 102c. As can be seen, the passenger seat arrangement 100 is in a configuration having only passenger seats 102a, 102b, 102c. In one example the passenger seats 102a, 102b, 102c are economy seats. In the illustrated example, the passenger seats 102a, 102b, 102c are arranged side by side on a base support structure 104. The base support structure 104 in various examples is arranged on a cabin floor of a vehicle cabin. For example, the base support structure 104 is coupled to or forms part of an aircraft cabin floor. The base support structure 104 includes support elements 106, 108, 110. In the illustrated implementation, the support elements 106, 108 are configured as cross-tubes and the support elements 110 are configured as vertical support legs. However, it should be appreciated that the support elements 106, 108, 110 can be any type and configuration of support element (e.g., different types of seating support members). As can be seen, in the illustrated example, each of the passenger seats 102a, 102b, 102c is coupled and supported on the support elements 106, 108. Additionally, the base support structure 104 is a frame structure coupling the passenger seats 102a, 102b, 102c to the vehicle floor.

In the illustrated example, the center passenger seat 102b is configured as a convertible seat assembly 120. That is, the center passenger seat 102b is convertible for different applications or uses, such as for non-seating purposes (e.g., stowage and/or privacy). In some examples, the center passenger seat 102b is configured to be easily retrofitted to remove the seating feature and replace the seating feature with different components defining a different feature or use. It should be noted that any of the passenger seats 102a-102c, including the end passenger seats 102a and 102c, are optionally configured as convertible seat assemblies 120. Thus, while the examples described herein are with respect to the center passenger seat 102b, the convertibility is not limited to only one seat or to a group of seats or to a type of seat.

The seat assembly 120 of the center passenger seat 102b in some configurations includes a base structure 130 having a seat pan shell 132 and a backrest shell 134. It is to be understood that the base structure 130 is various examples is a frame structure on which seating upholstery is arranged. The seat pan shell 132 and the backrest shell 134 likewise are frame structures in various examples, each configured to support seating upholstery. That is, the base structure 130, seat pan shell 132, backrest shell 134 are configured to have complementary structures to couple and support seating components to define a seating arrangement. As described in more detail, the base structure 130, seat pan shell 132, and backrest shell 134 are further configured to allow coupling and support of components to define different features with respect to the seating assembly.

The seat assembly 120 of the center passenger seat 102b in the illustrated example includes a seat surface arrangement 140 that is detachably attached to the base structure 130. That is, the seat surface arrangement 140 is removably mounted to the base structure 130 to define a seating arrangement (see FIG. 1A) that is usable for passenger seating. The seat surface arrangement 140 is a seat assembly sub-structure in some examples. The seat surface arrangement 140 includes a seat pan cushion 142 and a backrest cushion 144 in the illustrated example. A headrest cushion 146 is optionally included in the illustrated example. As such, a cushioned seating area for the passenger is thereby defined.

In one example, the headrest cushion 146 is part of the backrest cushion 144 and detachably attached to the backrest cushion 144. The seat pan cushion 142 and the backrest cushion 144 are separate parts in some examples. Alternatively, the seat surface arrangement 140 is configured as a one-piece element (e.g., unitary design), wherein the seat pan cushion 142 and the backrest cushion 144 together form a unitary body structure. The seat surface arrangement 140 is substantially L-shaped in the illustrated example to define a seat for a passenger. That is, when the seat surface arrangement 140 is arranged on the base structure 130, the seat assembly 120 forms the passenger seat 102. It should be appreciated that the seat surface arrangement 140 can have different shapes and configurations, such as based on the seating requirements, aircraft design, cabin usage, etc.

Figure 1B:
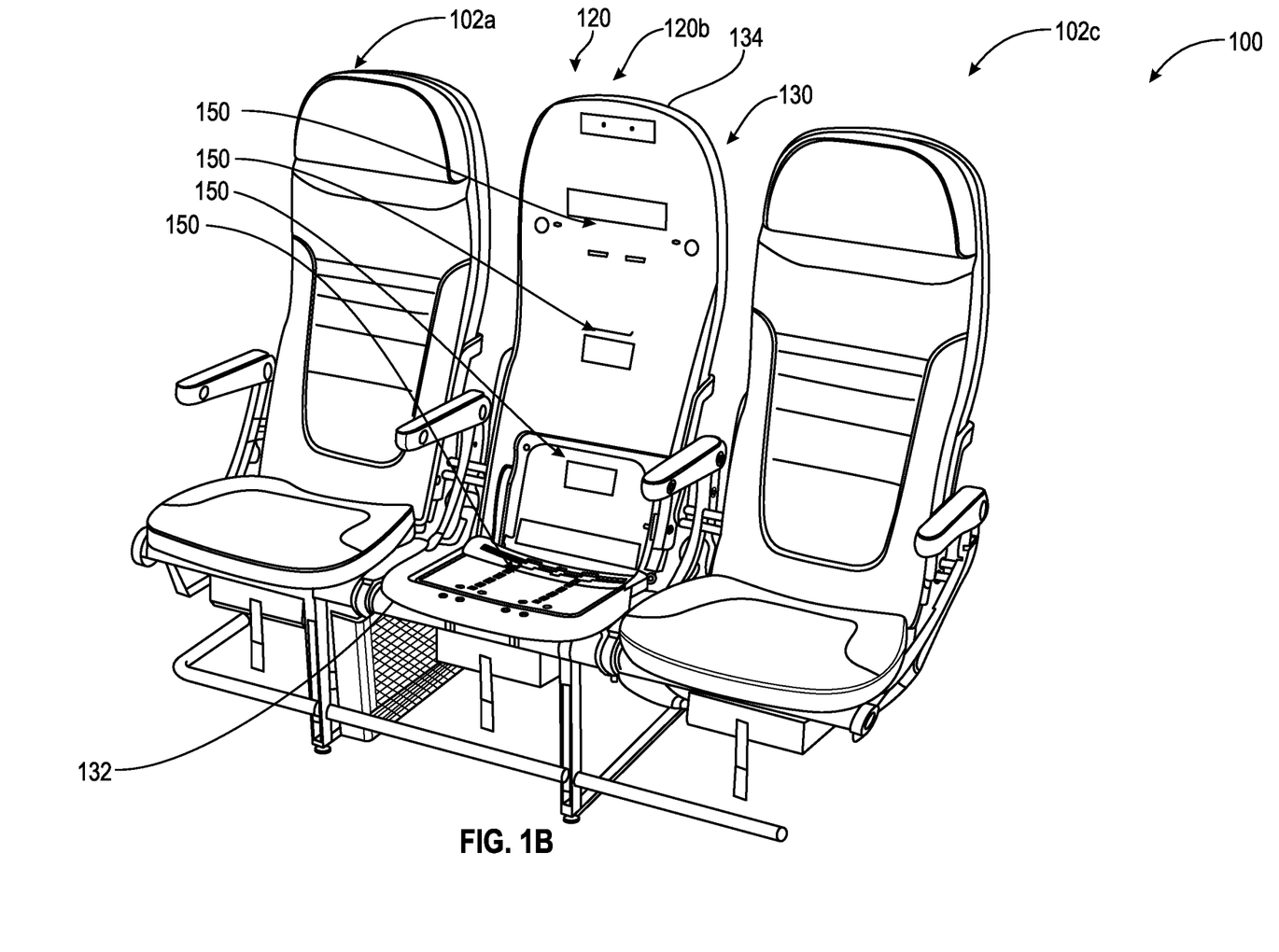
FIG. 1B shows a perspective view of a passenger seat arrangement having two passenger seats and a seat assembly with a disassembled passenger seat in accordance with an example.

FIG. 1B shows in a perspective view the passenger seat arrangement 100 having two passenger seats 102a, 102c (e.g., non-convertible seats or seats presently arranged in a seating configuration) and a seat assembly 120 with a disassembled center passenger seat 102b. In particular, the seat surface arrangement 140 is removed from the base structure 130. In this disassembled state, the base structure without any cushioning is exposed and includes elements to facilitate the convertibility or retrofitting as described in more detail herein.

Figure 1C:
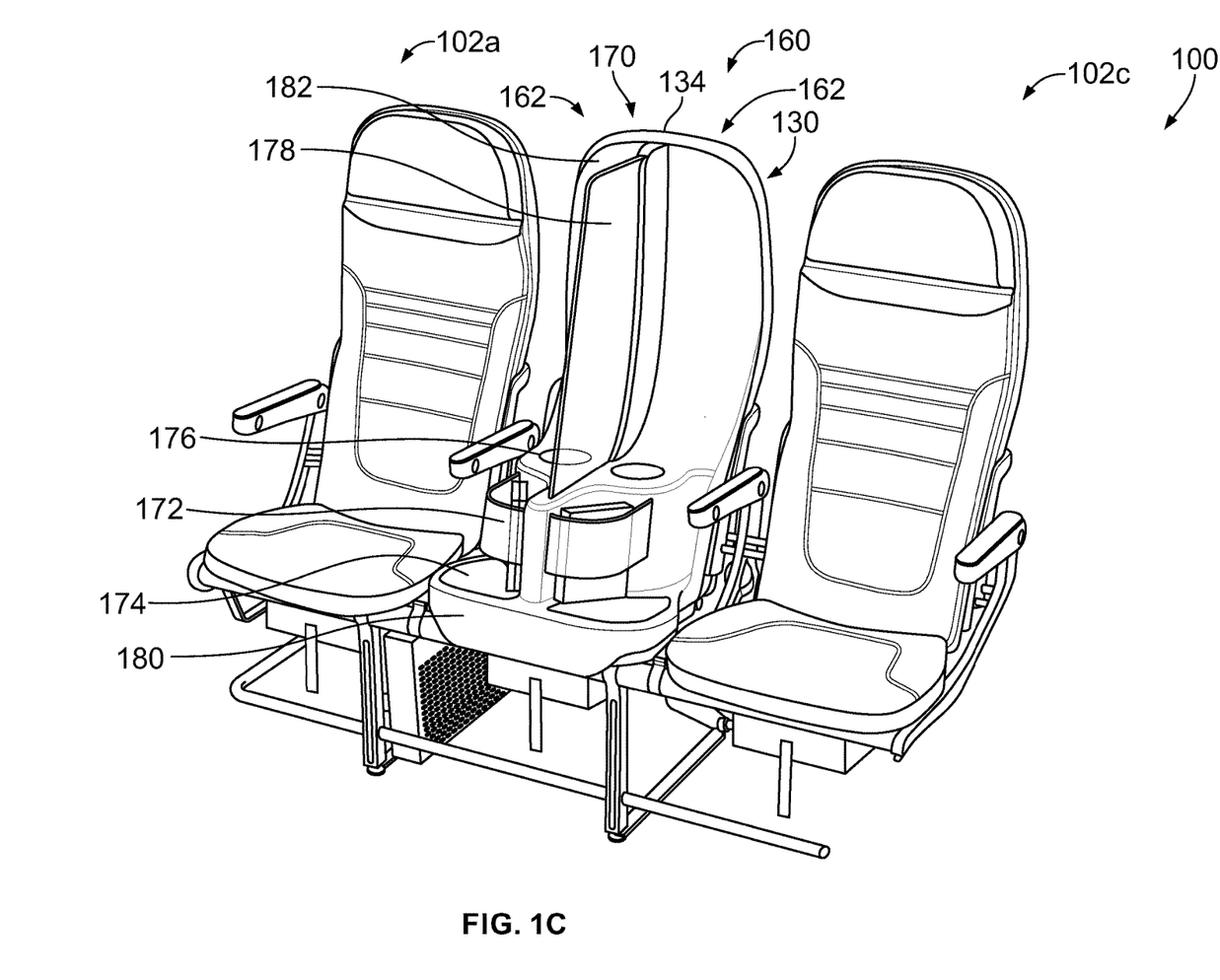
FIG. 1C shows a perspective view of a passenger seat arrangement having two passenger seats and a seat assembly configured as a utility element in accordance with an example.

For example, the seat surface arrangement 140 (as shown in FIG. 1A) and/or the utility surface arrangement 170 (as shown in FIG. 1C) are configured as retrofit parts. In one example, the entire seat assembly is a retrofit part. The base structure 130 is a retrofit part in some examples, which may be assembled to an already used and mounted seat frame structure. The base structure is attached to the common seat frame structure to provide changeable surfaces in some examples. For example, the seat cushion arrangement and the utility surface arrangement are exchangeable and alternatingly attachable to the base structure when one or the other is removed As can be seen, the base structure 130 includes one or more attachment structures 150 (e.g., coupling or mounting elements) to receive a corresponding structure (not shown) of the seat surface arrangement 140. That is, a complementary coupling arrangement is provided in various examples. As described herein, the seat surface arrangement 140 defines a seat cushion arrangement for passenger seating. As should be appreciated, the seat surface arrangement 140 can have or define different seat cushion arrangements formed by different configurations of seat pan cushions 142 and/or backrest cushions 144, such as with different hardness, seat covers, colors, sizes etc. In one example, the seat surface arrangements 140 are interchangeable and detachably attachable (e.g., removably coupled) to the base structure 130 as desired by customers, airlines or the like. The attachment structures 150 can have different coupling arrangements as desired or needed. For example, attachment structures 150 can be clip connections, screw connections and/or simple and secure click/snap-on connections and/or other interfaces (e.g., hook and loop strips) for a releasable connection between the base structure 130 and the seat surface arrangements 140. As should be appreciated, the arrangement of the attachment structures 150 can be varied. For example, the positioning, orientation, size, type, etc. of the attachment structures 150 on the base structure 130 can be varied.

In some examples where the utility surface arrangement 170 provides entertainment devices and/or in-flight entertainment interfaces, the utility surface arrangement 170 includes detachable powering connections. The powering connections are provided on the base structure 130 in some examples and are coupled to onboard sources.

In some examples, the seat surface arrangement 140 is configured as a seat assembly sub-structure with one or more of the attachment structures 150 (or other elements) configured as integrated quick attachment points. The utility surface arrangement 170 is also configured as a seat assembly sub-structure with integrated quick attachment points in some examples. The use of sub-structures allows individual customization.

In some examples, a crew member can easily remove one of the surface arrangements (e.g., seat surface arrangement 140 or utility surface arrangement 170) and exchange the surface arrangement with another surface arrangement. For example, the attachment structure 150 includes a locking device that is only unlockable by a crew member using a specific tool, so that passengers are not allowed to disassemble or change the surface arrangement.

FIG. 1C shows in a perspective view a passenger seat arrangement 100 having two passenger seats 102a, 102c (e.g., non-convertible seats or seats presently arranged in a seating configuration) and a seat assembly 120 configured as a utility element 160. That is, the seat assembly 120 has been converted from the passenger seat 102b (as shown in FIG. 1A) to the utility element 160. As should be appreciated, a reverse conversion from the utility element 160 to the passenger seat 102b is contemplated. That is, conversion between different configurations of the passenger seat arrangement 100 are possible.

The seat assembly 120 in this example includes a utility surface arrangement 170, wherein the base structure 130 is convertible into the passenger seat 102c and/or the utility element 160 depending on whether the seat surface arrangement 140 or the utility surface arrangement 170 is detachably attached to the base structure 130. When the utility surface arrangement 170 is arranged on the base structure 130, the seat assembly 120 forms the utility element 160.

In the illustrated example where the utility element 160 defines a center utility element (by converting the middle seat 102b), the utility element 160 can be used by a passenger seated in the passenger seat 102a and/or a passenger seated in the passenger seat 102c. That is, the utility element 160 is available for use by passengers on both sides of the middle seat 102b. The utility element 160 in this arrangement is thereby configured to a commonly known console element of a business and/or first class seat providing a number of comfort and utility features. For example, the utility element 160 is divided into a plurality of utility areas 162 (two are shown in this example, but more or less can be provided), which may be axis-symmetric (or have other symmetry) so that same features are provided to both left and right passengers adjacent to the utility element 160. That is, the utility areas 162 can be similarly configured or differently configured. For example, each utility area 162 can include the same utility features. In other examples, the utility element 160 is configured for a single passenger use, such as when the passenger seat arrangement 100 is configured in a two-seat arrangement or when access by a passenger on only one side of the utility element 160 is desired or needed. In some examples, the utility areas 162 are arranged on opposing or transverse sides of the base structure 130. For example, the utility surface arrangement in some examples includes two utility areas 162 on each transverse side of the base structure 130. For example, an upper surface element 182 and/or a bottom surface element 180 includes left and right utility areas for left and right passengers adjacent to the seat assembly.

The utility surface arrangement 170, and therefore the utility element 160, in the illustrated example includes a storage compartment 172 and/or amenity kit, a shelf 174, a cup holder 176, a partition wall 178 (e.g., privacy wall), an entertainment device, in-flight entertainment interfaces (IFE), a table device and/or a passenger support element (e.g., an armrest, a booster seat, a headrest, such as a side headrest for a laterally seated passenger) and/or different usable features for a passenger. It should be appreciated that different features or elements can be provided. For example, the utility surface arrangement 170 in one more examples includes at least one of a storage compartment, a shelf, a cup holder, a partition wall, an entertainment device, in-flight entertainment interfaces such as supplemental A/C outlets, ports, plugs and sockets and/or a passenger support element.

The passenger support element is, for example, an armrest, a booster seat, or a headrest, such as a side headrest for a laterally seated passenger.

Further, in some examples, the seat assembly is convertible from a passenger seat to a utility element for crew members. In these examples, the utility element for crew members provides storage compartments and shelves, which include deposit and/or locker features for a number of different items, whereas the utility element is easily accessible for crew members within a passenger seating cabin.

In one example, the utility surface arrangement 170 includes the bottom surface element 180 and the upper surface element 182, wherein the upper surface element 182 extends substantially vertically from the bottom surface element 180. The bottom surface element 180 and the upper surface element 182 can be formed of different materials, such as a synthetic material. The bottom surface element 180 and the upper surface element 182 are configured in some examples as hard shells. The bottom surface element 180 and the upper surface element 182 include a cover made of soft material, such as textile and/or leather to provide cosmetic appearance or comfort in some examples (e.g., to cover the hard shell).

In some examples, the utility surface arrangement 170 is configured as a one-piece element. For example, the utility surface arrangement 170 is substantially L-shaped. The utility surface arrangement 170 forms a unitary body structure that has a wide variety of utility features. Further, a plurality of utility surface arrangements 170 can be provided, each with different utility features, colors, privacy features, sizes to interchange utility surface arrangements 170 on the base structure 130, etc. That is, different preconfigured utility surface arrangements 170 are provided in some examples for ease in converting the seat 102*b*. In some examples, the utility surface arrangements 170 include one or more modifiable elements. The utility surface arrangements 170 are interchangeable and detachably attachable to the base structure 130 as desired by customers, airlines or the like. For example, the partition wall 178 is not provided or installed in some examples (e.g., if both passengers of the passenger seats 102*a*, 102*c* know each other).

In some examples, the utility surface arrangement 170 includes a corresponding attachment structure (not shown) configured to couple to the attachment structure 150 of the seat pan shell 132. In particular, the bottom surface element 180 in various examples includes the corresponding attachment structure configured to couple to the attachment structure 150 of the seat pan shell 132 (similar to the attachment of the seat surface arrangement 140 described herein).

In some examples, the utility surface arrangement 170 includes a corresponding attachment structure (not shown) configured to couple to the attachment structure 150 of the backrest shell 134. In particular, the upper surface element 182 includes the corresponding attachment structure configured to couple to the attachment structure 150 of the backrest shell 134. The attachment structures 150 can be, for example, clip connections, screw connections and/or simple and secure click/snap-on connections and/or other interfaces (e.g., hook and loop strips) for a releasable connection between the base structure 130 and the utility surface arrangement 170. It should be noted that the connection arrangements for the different arrangements, such as the seat surface arrangement 140 and the utility surface arrangement 170 can be the same or different. That is, one or more of the same attachment structures 150 can be used when configuring the seat 102*b* in the seat surface arrangement 140 and the utility surface arrangement 170, or one or more different attachment structures 150 can be used when configuring the seat 102*b* in the seat surface arrangement 140 and the utility surface arrangement 170. For example, some of the attachment structures 150 used when configuring the seat 102 in the seat surface arrangement 140 are not used when configuring the seat in the utility surface arrangement 170, and vice versa.

Figure 2:
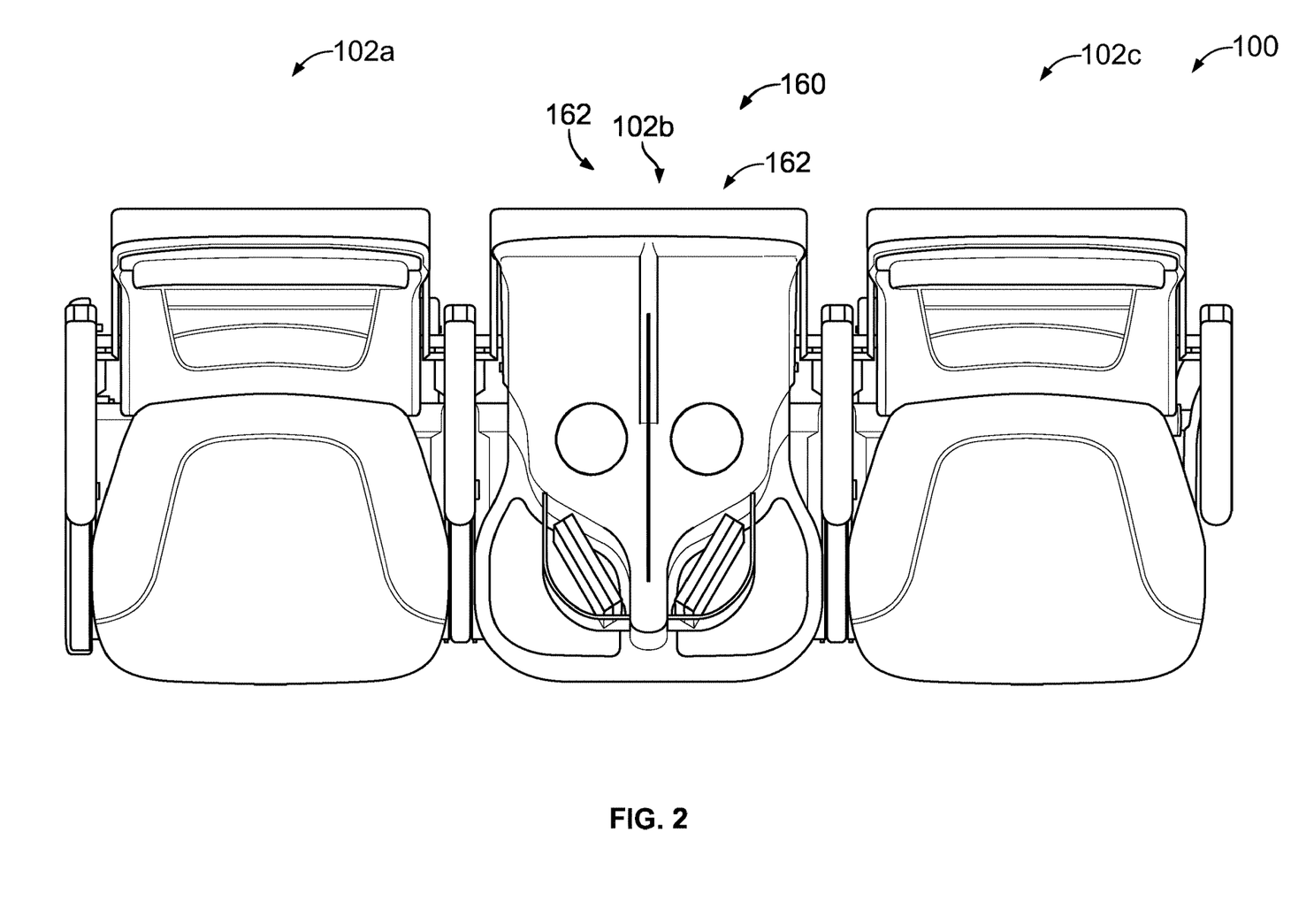
FIG. 2 shows a top view of a passenger seat arrangement having two passenger seats and a seat assembly configured as a utility element in accordance with an example.

FIG. 2 shows in a top view a passenger seat arrangement 100 having two passenger seats 102*a*, 102*c* and a seat assembly 120 of the middle seat 102*b* configured as the utility element 160 (similar to FIG. 1C). In this example, the utility areas 162 are similarly configured having the same features.

Figure 3:
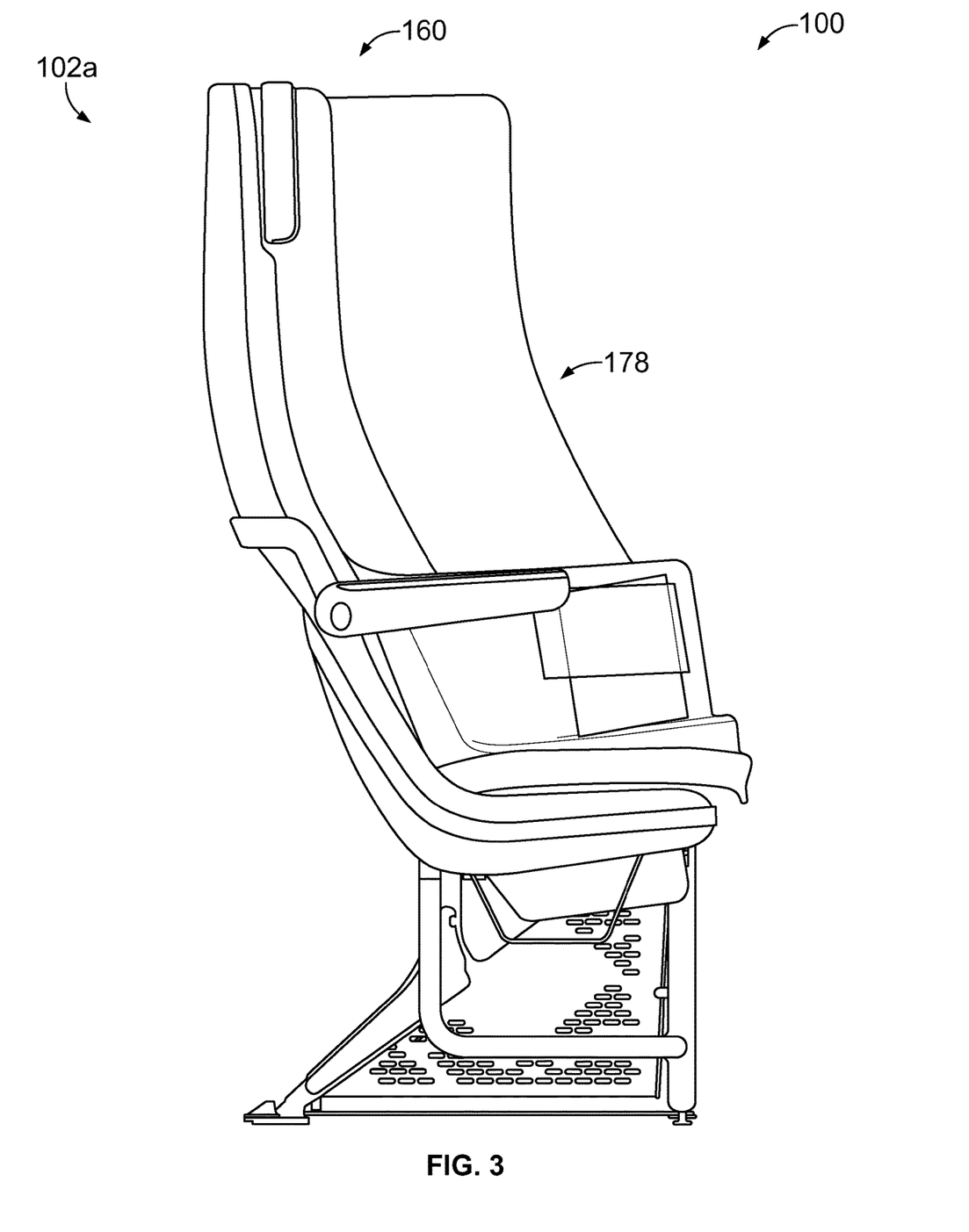
FIG. 3 shows a side view of a passenger seat arrangement having a passenger seat and a seat assembly configured as a utility element in accordance with an example.

FIG. 3 shows in a side view a passenger seat arrangement 100 that includes a passenger seat 102*a* and a seat assembly 120 of the seat 102*b* configured as the utility element 160. As can be seen more clearly in this Figure, the partition wall 178 is configured to provide privacy for the passengers in each of the seats 102*a*, 102*b*. In some examples, the partition wall 178 is removable, such as if privacy is not desired.

Thus, various implementations as described in one or more examples provide seats, which include seat assemblies that allow for easy conversion to different uses. As described herein, a "typical" seat configuration is convertible to a utility configuration to allow access to other features that might not otherwise be available to some passengers. In some examples, interchangeable seat surface arrangement have different features, for example, different upholstery properties and/or seat cover properties and/or colors and/or comfort features. Moreover, interchangeable utility surface arrangements are provided with, for example, different utility features for different needs and requirements of individual passengers.

Figure 4:
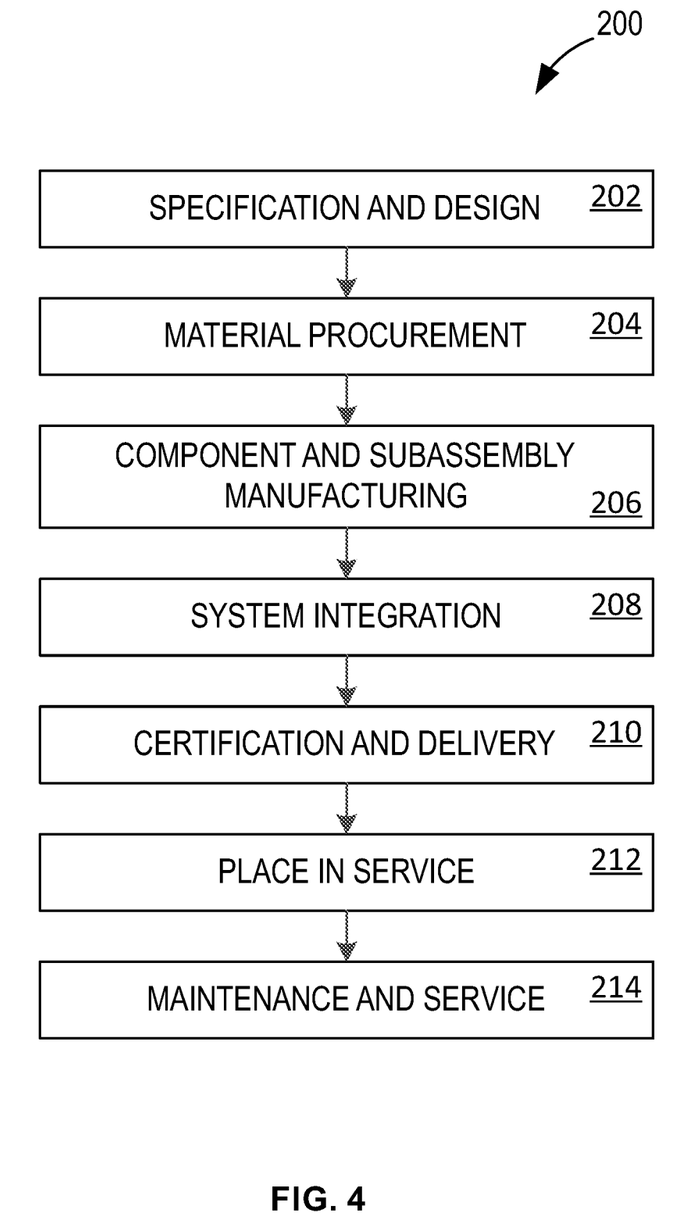
FIG. 4 is a block diagram of an apparatus production and service method that advantageously employs various aspects in accordance with an example.

Some examples described herein are used in manufacturing and service applications as shown and described in relation to FIGS. 3 to 6. Thus, examples described herein are described in the context of an apparatus of manufacturing and service method 200 shown in FIG. 4 and an apparatus 300 shown in FIG. 5. In FIG. 4, a diagram illustrating an apparatus manufacturing and service method 200 is depicted in accordance with an example. In one example, during pre-production, the apparatus manufacturing and service method 200 includes specification and design 202 of the apparatus 300 and material procurement 204. During production, component, and subassembly manufacturing 206 and system integration 208 of the apparatus 300 takes place. Thereafter, the apparatus 300 goes through certification and delivery 210 in order to be placed in service 212. While in service by a customer, the apparatus 300 is scheduled for routine maintenance and service 214, which in one example, includes modification, reconfiguration, refurbishment, and other maintenance or service subject to configuration management, described herein.

In one example, each of the processes of the apparatus manufacturing and service method 200 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

Figure 5:
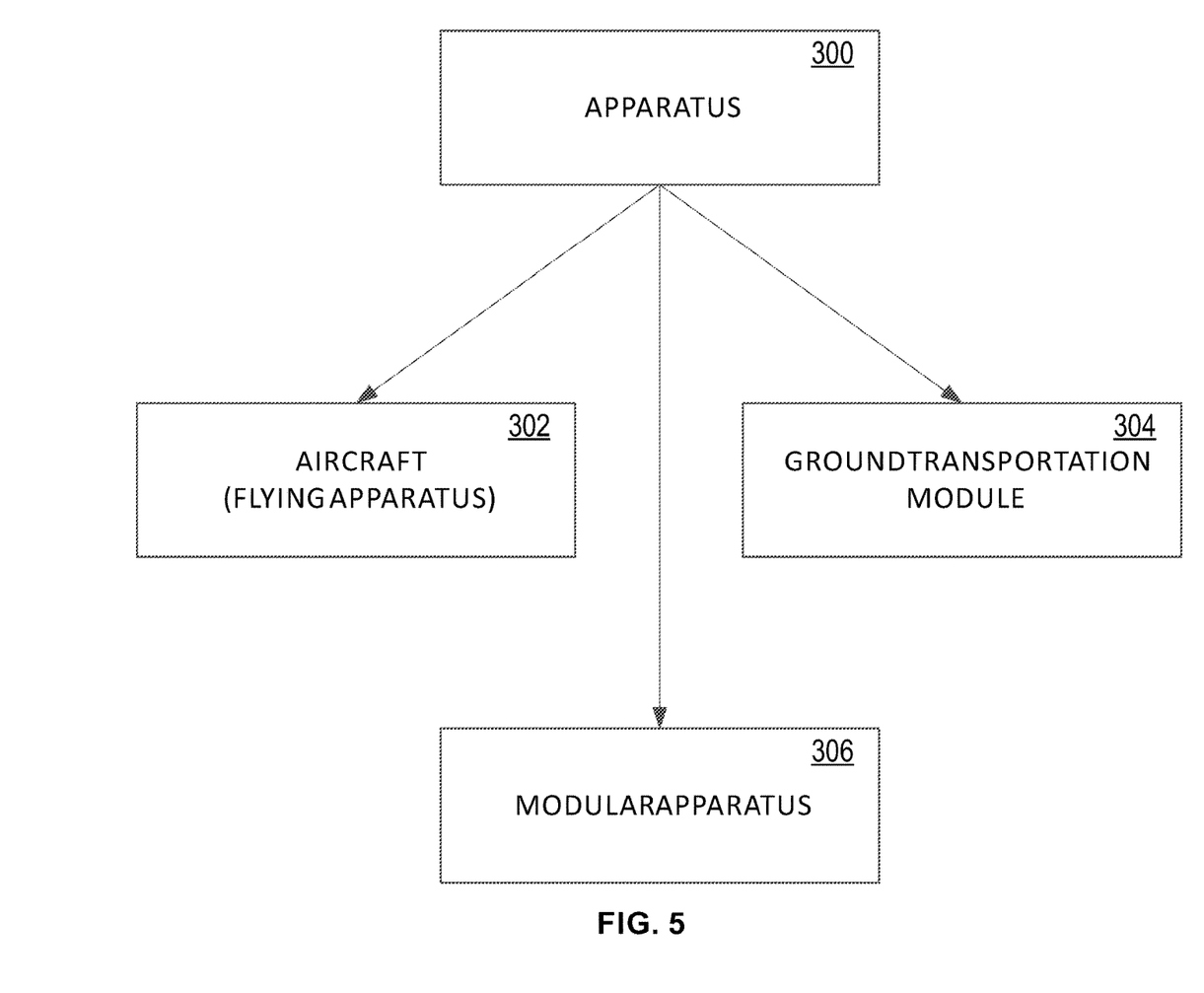
FIG. 5 is a block diagram of an apparatus for which various aspects may be advantageously employed in accordance with an example.

With reference now to FIG. 5, the apparatus 300 is provided. As shown in FIG. 5, an example of the apparatus 300 is a flying apparatus 302, such as an aerospace vehicle, aircraft, air cargo, flying car, satellite, planetary probe, deep space probe, solar probe, and the like. As also shown in FIG. 5, a further example of the apparatus 300 is a ground transportation apparatus 304, such as an automobile, a truck, heavy equipment, construction equipment, a boat, a ship, a submarine, and the like. A further example of the apparatus 300 shown in FIG. 5 is a modular apparatus 306 that comprises at least one or more of the following modules: an air module, a payload module, and a ground module. The air module provides air lift or flying capability. The payload module provides the capability of transporting objects such as cargo or live objects (people, animals, etc.). The ground module provides the capability of ground mobility. The solutions and examples herein can be applied to each of the modules separately or in groups, such as air and payload modules, or payload and ground modules, etc. or all modules.

Figure 6:
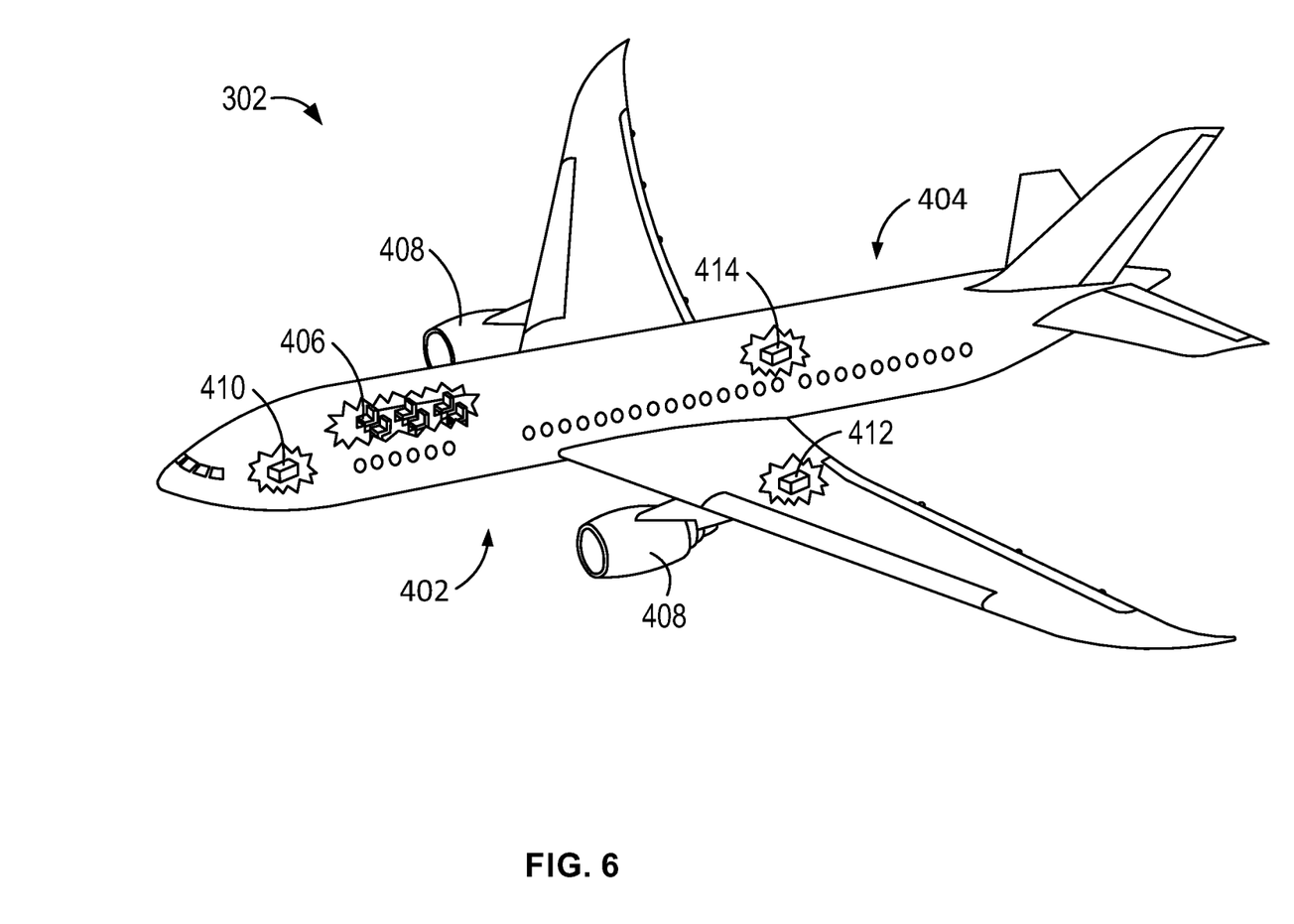
FIG. 6 is a schematic perspective view of a particular flying apparatus in accordance with an example.

With reference now to FIG. 6, a more specific diagram of the flying apparatus 302 is depicted in which an implementations described herein are advantageously employed. In this example, the flying apparatus 302 is an aircraft produced by the apparatus manufacturing and service method 200 in FIG. 4 and includes an airframe 402 with a plurality of systems 404 and an interior 406, which can include seats (e.g., the seats 102a-102c) that are convertible as described herein. Examples of the plurality of systems 404 include one or more of a propulsion system 408, an electrical system 410, a hydraulic system 412, and an environmental system 414. However, other systems are also candidates for inclusion. Although an aerospace example is shown, different advantageous examples are applied to other industries, such as the automotive industry, etc.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects and implementations or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the various examples in detail, it will be apparent that modifications and variations are possible without departing from the scope of aspects as defined in the appended claims. As various changes could be made in the above constructions, products, and methods without departing from the scope of aspects describe herein, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations described herein without departing from their scope. While the dimensions and types of materials described herein are intended to define the parameters of the various implementations described herein, the implementations are by no means limiting and are example implementations. Many other implementations will be apparent to those of ordinary skill in the art upon reviewing the above description. The scope of the various implementations described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations, including the best mode, and also to enable any person of ordinary skill in the art to practice the various implementations, including making and using any devices or systems and performing any incorporated methods. The patentable scope of the various implementations is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly for a vehicle cabin comprising:
   a base structure connected to a floor of the vehicle cabin and having a seat pan shell and a backrest shell defining a non-seating structure; and
   one or more attachment structures directly connected to each of the seat pan shell and an upper forward-facing portion of the backrest shell, the one or more attachment structures configured to interchangeably couple, one at a time, a seat surface arrangement or a utility surface arrangement directly to the seat pan shell and the backrest shell,
   wherein the seat surface arrangement includes one or more cushions configured to cover both of the seat pan shell and the backrest shell, and
   wherein the base structure is convertible between a passenger seat and a non-seat utility element based on the coupling of the seat surface arrangement or the utility surface arrangement, respectively, to the base structure.

2. The seat assembly of claim 1, wherein the one or more attachment structures form part of the base structure.

3. The seat assembly of claim 1, wherein the one or more cushions of the seat surface arrangement comprises at least one seat pan cushion and at least one backrest cushion.

4. The seat assembly of claim 1, wherein the utility surface arrangement comprises a partition wall extending vertically with respect to the seat pan shell and along the backrest shell; the partition wall configured to provide privacy for an adjacent passenger.

5. The seat assembly of claim 1, wherein the seat surface arrangement and the utility surface arrangement are configured to be exchangeable and alternatingly attachable to the base structure.

6. The seat assembly of claim 1, wherein the utility surface arrangement comprises a bottom surface element and an upper surface element, the upper surface element extending substantially vertically from the bottom surface element.

7. The seat assembly of claim 6, wherein the upper surface element and the bottom surface element are configured as a one-piece element.

8. The seat assembly of claim 1, wherein the one or more attachment structures comprises a first attachment structure and a second attachment structure, and wherein the utility surface arrangement comprises the first attachment structure configured to couple to the second attachment structure of the seat pan shell.

9. The seat assembly of claim 1, wherein the one or more attachment structures comprises a first attachment structure and a second attachment structure, and wherein the utility surface arrangement comprises the first attachment structure configured to couple to the second attachment structure of the backrest shell.

10. The seat assembly of claim 1, wherein the utility surface arrangement comprises a plurality of utility areas on opposing sides of the base structure.

11. A passenger seat arrangement comprising:
    a first passenger seat;
    a second passenger seat; and
    a third passenger seat, wherein the second passenger seat is between the first and third passenger seats, and the first, second and third passenger seats together define a seating row, at least one of the first passenger seat, the second passenger seat, and the third passenger seat comprising a seat assembly, wherein the seat assembly comprises:
    a base structure having a seat pan shell and a backrest shell; and
    one or more attachment structures configured to interchangeably couple the seat pan shell and the backrest shell directly to a seat surface arrangement or a utility surface arrangement wherein the seat surface arrangement includes one or more cushions configured to cover both of the seat pan shell and the backrest shell, and, wherein the base structure is convertible based on the coupling of the seat surface arrangement or the utility surface arrangement, respectively, to the base structure by replacing one of the seat surface arrangement and the utility surface arrangement with the other one of the seat surface arrangement and the utility surface arrangement;

wherein the seat assembly comprises the attachment structures on each of an upper forward-facing portion of the backrest shell and the seat shell, the attachment structures configured for mating with corresponding attachment structures on seat surface arrangement or a utility surface arrangement.

12. The passenger seat arrangement of claim 11, wherein each of the first passenger seat, the second passenger seat, and the third passenger seat comprises the seat assembly.

13. The passenger seat arrangement of claim 11, wherein the seat assembly comprises one or more retrofit components.

14. The passenger seat arrangement of claim 11, wherein the first passenger seat, the second passenger seat, and the third passenger seat are aircraft seats.

15. A method comprising the steps of:
removing a seat unit from a frame of a passenger seat assembly in a row of passenger seats in an aircraft cabin by disconnecting mounting elements located on each of an upper forward-facing portion of a backrest frame and a seat frame from attachment elements on the seat unit; the seat unit comprising one or more cushions configured to cover both of a backrest and a seat of the passenger seat assembly; and
connecting a non-seat unit to the passenger seat assembly by mating the mounting elements on the backrest frame and the seat frame with corresponding attachment elements on the non-seat unit.

16. The method of claim 15 further including removing the non-seat unit from the frame of the passenger seat assembly by disconnecting mounting elements on the backrest frame and the seat frame from corresponding attachment elements on the non-seat unit.

17. A passenger seating arrangement for an aircraft cabin comprising:
at least two passenger seat assemblies arranged adjacently in a row;
wherein at least one passenger seat assembly in the row is a convertible seat assembly that includes a frame having mounting elements on each of an upper forward-facing portion of a backrest and a seat of the frame, the mounting elements configured for mating with corresponding attachment elements on a seat unit and a non-seat unit;
the convertible seat assembly having a first configuration and a second configuration;
wherein the first configuration includes the seat unit connected directly to the backrest and the seat of the frame in which the mounting elements of the backrest and the seat of the frame are connected to the corresponding attachment elements of the seat unit, wherein when in the first configuration, the convertible seat assembly is configured as a passenger seat;
wherein the second configuration includes a non-seat unit connected directly to the backrest and the seat of the frame in which the mounting elements of the backrest and the seat of the frame are connected to the corresponding attachment elements of the non-seat unit; and
wherein the frame is configured to connect to only one of the seat unit or non-seat unit at a time; and
wherein the seat unit includes one or more cushion structures configured to cover both of the backrest and the seat of the frame.

18. The passenger seating arrangement of claim 17, wherein the seat of the frame includes an upper facing side, and the mounting elements are located on the upper facing side.

19. The passenger seating arrangement of claim 18, wherein the non-seat unit covers the forward-facing side and the upper facing side when in the second configuration.

20. The passenger seating arrangement of claim 17, wherein the non-seat unit includes at least one of a storage compartment, a shelf, a cup holder, a privacy wall, an entertainment device, in-flight entertainment interfaces, and a passenger support element.

* * * * *